United States Patent
Metz et al.

(10) Patent No.: US 10,503,387 B2
(45) Date of Patent: Dec. 10, 2019

(54) INTELLIGENT SCROLLING OF ELECTRONIC DOCUMENT

(71) Applicant: Apple Inc., Cupertino, CA (US)

(72) Inventors: Jean Sebastiaen Metz, Santa Clara, CA (US); Pepijn T. Zoon, San Francisco, CA (US); Matthijs Jacob Frederik Zoon, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 584 days.

(21) Appl. No.: 14/871,815

(22) Filed: Sep. 30, 2015

(65) Prior Publication Data
US 2016/0357382 A1 Dec. 8, 2016

Related U.S. Application Data

(60) Provisional application No. 62/172,148, filed on Jun. 7, 2015, provisional application No. 62/172,154, filed on Jun. 7, 2015.

(51) Int. Cl.
*G06F 3/0485* (2013.01)
(52) U.S. Cl.
CPC .................. *G06F 3/0485* (2013.01)
(58) Field of Classification Search
CPC .................................................. G06F 3/0485
USPC ....................................................... 715/785
See application file for complete search history.

(56) References Cited

U.S. PATENT DOCUMENTS

| | | | |
|---|---|---|---|
| 6,771,284 B1* | 8/2004 | Anderson | G06F 3/0481 715/705 |
| 7,117,437 B2 | 10/2006 | Chen et al. | |
| 7,640,516 B2 | 12/2009 | Atkins | |
| 7,788,579 B2 | 8/2010 | Berkner et al. | |
| 8,291,314 B2 | 10/2012 | Atkins | |
| 8,327,262 B2 | 12/2012 | Tarumi | |
| 8,584,034 B2 | 11/2013 | Holt et al. | |
| 8,589,977 B1* | 11/2013 | Frusciano | H04N 5/44543 715/785 |
| 8,665,294 B2 | 3/2014 | Hirooka | |
| 9,021,386 B1* | 4/2015 | Rasmussen | G06F 3/002 715/785 |
| 9,152,292 B2 | 10/2015 | Xiao et al. | |
| 9,229,918 B2* | 1/2016 | Zaman | G06F 3/048 |
| 9,342,515 B2* | 5/2016 | Lee | G06F 3/017 |
| 9,348,498 B2* | 5/2016 | Demopoulos | G06F 3/04855 |
| 9,396,167 B2 | 7/2016 | Doll et al. | |
| 9,557,876 B2* | 1/2017 | Matas | G06F 3/048 |

(Continued)

*Primary Examiner* — Daeho D Song
(74) *Attorney, Agent, or Firm* — Fletcher Yoder PC

(57) ABSTRACT

A novel method for scrolling an electronic document (e.g., a webpage, article, etc.) that is displayed in a display area on a screen is provided. The method receives a swipe gesture on a touch-sensitive input surface, which can be a touch-sensitive surface of a cursor controller (e.g., trackpad, etc.) or can be a touch-sensitive surface of the screen. Based on the swipe gesture's velocity, the method scrolls the document on the display screen and identifies a first location on the document for ending the scrolling. Also, based on this velocity, the method identifies a size for a neighboring region around the identified location. The method then determines whether a scroll stoppage marker is defined for the neighboring region. Each scroll stoppage marker specifies a location within the document for stopping the document's scrolling.

23 Claims, 10 Drawing Sheets

(56) References Cited

U.S. PATENT DOCUMENTS

| | | | |
|---|---|---|---|
| 9,569,084 B2* | 2/2017 | Takahashi | G06F 3/0488 |
| 2008/0039188 A1* | 2/2008 | Kato | G07F 17/3265 |
| | | | 463/20 |
| 2008/0068403 A1* | 3/2008 | Kobashi | G06F 3/0485 |
| | | | 345/684 |
| 2008/0134078 A1* | 6/2008 | Han | G06F 3/0485 |
| | | | 715/784 |
| 2010/0123734 A1* | 5/2010 | Ozawa | G06F 3/0488 |
| | | | 345/619 |
| 2011/0074699 A1* | 3/2011 | Marr | G06F 3/0485 |
| | | | 345/173 |
| 2011/0302532 A1 | 12/2011 | Missig | |
| 2012/0030614 A1* | 2/2012 | Tuli | G06F 3/04855 |
| | | | 715/786 |
| 2012/0167003 A1 | 6/2012 | Johansson | |
| 2012/0174005 A1* | 7/2012 | Deutsch | G06F 3/04817 |
| | | | 715/764 |
| 2012/0272181 A1* | 10/2012 | Rogers | G06F 3/0482 |
| | | | 715/784 |
| 2012/0317513 A1* | 12/2012 | Mochizuki | G06F 3/0485 |
| | | | 715/830 |
| 2013/0111396 A1* | 5/2013 | Brid | G06F 3/0485 |
| | | | 715/784 |
| 2013/0159878 A1* | 6/2013 | Kim | G06F 3/048 |
| | | | 715/752 |
| 2013/0159936 A1* | 6/2013 | Yamaguchi | G06F 3/0485 |
| | | | 715/850 |
| 2013/0190977 A1* | 7/2013 | Onaka | B60K 37/00 |
| | | | 701/36 |
| 2014/0007005 A1 | 1/2014 | Libin et al. | |
| 2014/0136960 A1* | 5/2014 | Borza | G06F 3/0485 |
| | | | 715/247 |
| 2014/0149921 A1 | 5/2014 | Hauser et al. | |
| 2014/0149922 A1* | 5/2014 | Hauser | G06F 3/0485 |
| | | | 715/784 |
| 2014/0258849 A1 | 9/2014 | Chung et al. | |
| 2015/0067582 A1* | 3/2015 | Donnelly | G06F 3/0485 |
| | | | 715/784 |
| 2015/0350735 A1* | 12/2015 | Koser | H04N 21/435 |
| | | | 725/37 |
| 2015/0355779 A1* | 12/2015 | Kanamori | G06F 3/0485 |
| | | | 345/173 |

* cited by examiner

INTELLIGENT SCROLLING OF ELECTRONIC DOCUMENT

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Many users rely on electronic computing devices with touch-sensitive screens for viewing and manipulating electronic documents. In these circumstances, users may navigate through an electronic document on the display with gestures on the device's touch-sensitive screen. Unfortunately, many existing methods for scrolling documents are cumbersome and inefficient, and often do not result in the display of electronic documents according to a user's desires. In addition, existing methods of scrolling through documents take longer than necessary, thereby wasting energy. This latter consideration is particularly important in battery-operated devices. Accordingly, there is a need for computing devices with faster, more efficient methods and interfaces for scrolling documents in accordance with heuristics that improve electronic document display.

SUMMARY

Some embodiments of the invention provide a novel method for scrolling an electronic document (e.g., a webpage, article, etc.) that is displayed in a display area on a screen. The method receives a swipe gesture on a touch-sensitive input surface, which can be a touch-sensitive surface of a cursor controller (e.g., trackpad, etc.) or can be a touch-sensitive surface of the screen. Based on the swipe gesture's velocity, the method of some embodiments scrolls the document on the display screen and identifies a first location on the document for ending the scrolling. Also, based on this velocity, the method identifies a size for a neighboring region around the identified location. The method then determines whether a scroll stoppage marker is defined for the neighboring region. Each scroll stoppage marker specifies a location within the document for stopping the document's scrolling.

When the method identifies a scroll stoppage marker in the identified neighboring region, the method terminates the document's scrolling at the marker's specified location instead of the identified first location. To terminate the scrolling, the method in some embodiments positions the marker's specified location at the boundary of the display area (i.e., the area for displaying the document on the screen) instead of the identified first location. For instance, in some embodiments, the method positions the marker's specified location at the top boundary of the display area instead of positioning the identified first location at this boundary position. When the method cannot identify a scroll stoppage marker in the identified neighboring region, the method terminates the document's scrolling with the first location at the display area boundary.

In some embodiments, the method determines whether the velocity exceeds a threshold. When the velocity does not exceed the threshold, the method in some embodiments terminates the scrolling with the identified first location at the display area boundary. Conjunctively, or alternatively, for larger gesture velocities, the method of some embodiments identifies larger neighboring regions around the identified first location to examine for scroll stoppage markers. Thus, the method in these embodiments identifies a smaller first neighboring region when the identified velocity has a smaller first value, and identifies a larger second neighboring region when the identified velocity has a larger second value.

In some embodiments, the method identifies the first location by (1) defining a scrolling function that modifies scrolling speed from the initial velocity to zero, and (2) using the scrolling function to identify the first location as a document location at the boundary of the display area when the scrolling velocity is zero. In some of these embodiments, the method terminates the scrolling at the scroll stoppage marker's location by modifying the scrolling function to identify this location as the document location that is positioned at the boundary of the display area when the scrolling velocity is zero.

The identified region in some embodiments may contain multiple stoppage markers. In these embodiments, the method needs to select one of the stoppage markers as the marker that defines the location where the scrolling should stop. The method selects this stoppage marker differently in different embodiments. For instance, in some embodiments, the method selects the stoppage marker that is the first stoppage marker in the direction of the scroll. In other embodiments, the method selects the stoppage marker that specifies a document location that is closest to the identified first location. In yet other embodiments, different stoppage markers in the region can have different priorities. In some of these embodiments, the method selects the stoppage marker that has the highest priority in the region.

In some embodiments, each stoppage marker is defined as a line for snapping an end location of a gesture-based scrolling operation. Also, in some embodiments, the stoppage markers are inserted into the document after the layout of the document is defined. For instance, the method in some embodiment first dynamically defines the layout of the document after receiving the document definition for generating the document display, and then inserts the stoppage markers within the defined layout. In some embodiments, the document definition specifies multiple components (e.g., body text component, image component, pull quote component, title component, advertisement component) of the document. In some embodiments, the method defines the document layout by specifying an arrangement of the document components. Also, in some of these embodiments, the method inserts the stoppage markers within the layout at locations of some or all of the components.

One of ordinary skill will realize that different embodiments use different combination of the inventive features that are described above. For instance, some embodiments do not identify different sized candidate scroll stoppage regions based on different swipe gesture speeds. Some of these embodiments may just insert scroll stoppage markers into the document after dynamically generating the document layout. Other embodiments may simply use different heuristics to select between different candidate scroll stoppage markers in a candidate region.

Therefore, one of ordinary skill will realize that the preceding Summary is intended to serve as a brief introduction to some inventive features of some embodiments. Moreover, this Summary is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an intelligent method for scrolling an electronic document (e.g., a webpage, article, etc.) that is displayed in a display area on a screen. The method receives a swipe gesture on a touch-sensitive input surface (e.g., a touch-sensitive surface of a cursor controller (e.g., trackpad, etc.) or a touch-sensitive surface of the screen.). Based on the swipe gesture's velocity, the method of some embodiments scrolls the document on the display screen and identifies a first location on the document for ending the scrolling. Also, based on this velocity, the method identifies a size for a region around the identified location. The method then determines whether a scroll stoppage marker is defined for the region. Each scroll stoppage marker specifies a location within the document for stopping the document's scrolling.

When the method identifies a scroll stoppage marker in the identified region, the method terminates the document's scrolling at the marker's specified location instead of the identified first location. When the method cannot identify a scroll stoppage marker in the defined region, the method terminates the document's scrolling with the first location at the display area boundary. On the other hand, when the method identifies a marker in the defined region, the method positions the marker's specified location at the boundary of the display area (i.e., the area for displaying the document on the screen) instead of the identified first location. The display area can cover the entire display screen in the direction of the scroll, or it can cover an area less than the entire display screen in the direction of the scroll.

Figure 1:
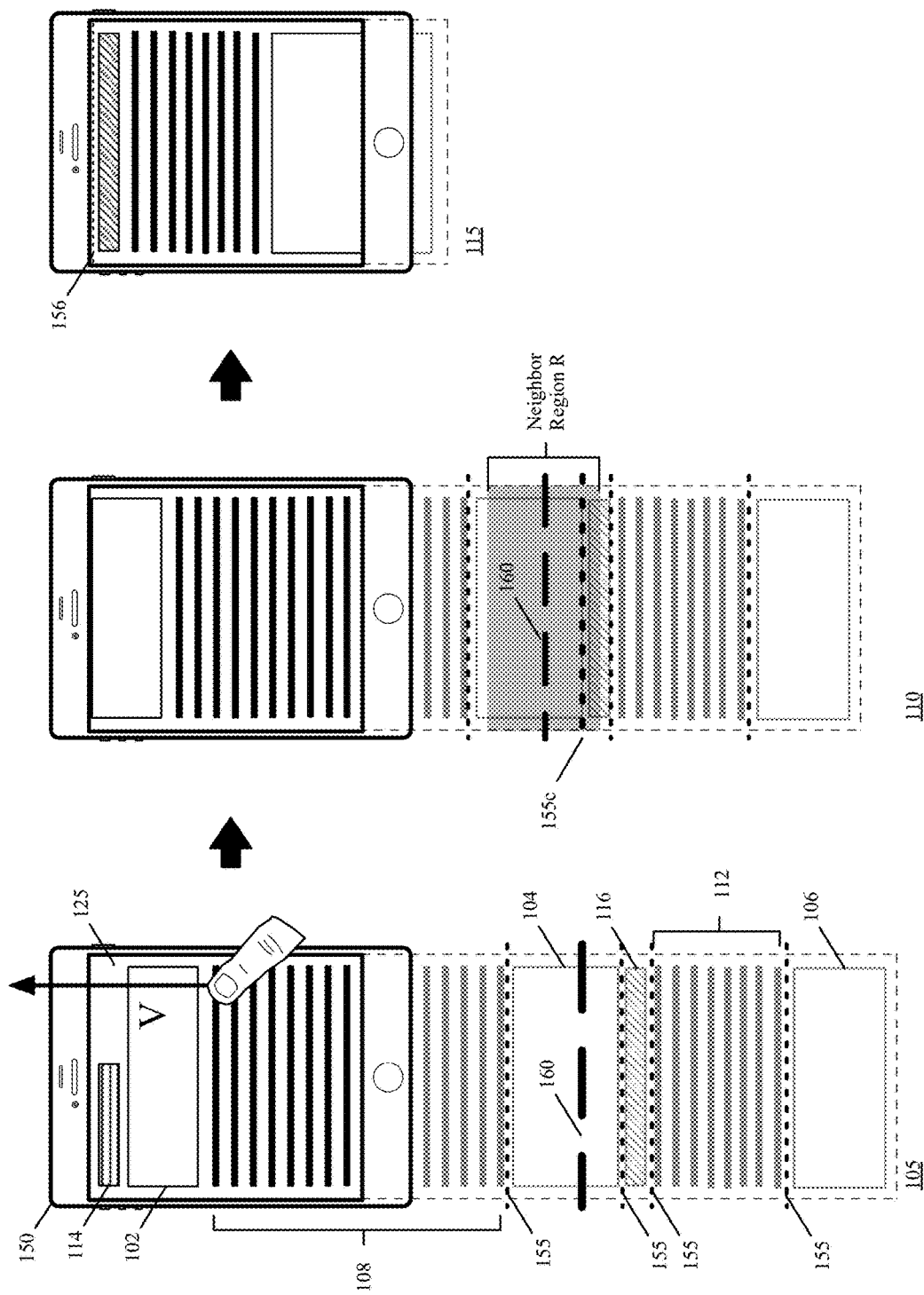
FIG. 1 illustrates one example of the intelligent scrolling method of some embodiments.

FIG. 1 illustrates one example of the intelligent scrolling method of some embodiments. This example is provided for a reader application that executes on a mobile device 150 with a touch-sensitive screen. In this example, the reader application uses the intelligent scrolling method of some embodiments to scroll through an article that it presents. One of ordinary skill will realize that in other embodiments, the reader application can use the scrolling method to scroll other kinds of displays (e.g., displays of a feed page that displays summaries of multiple articles). Also, in other embodiments, other types of applications use the scrolling method of some embodiments to scroll other types of documents.

The example illustrated in FIG. 1 is presented in terms of three operational stages 105-115 of the reader application. Through the reader application, a user can browse a selection of articles, select an article, and review the selected article. This reader application is further described in con-currently filed U.S. Provisional Patent Application No. 62/172,175, filed Jun. 7, 2015, entitled "Graphical User Interface for a Document Reader Application".

The first stage 105 shows the reader application's user interface (UI) 125 presenting an article. As shown, because of the size of the article, only a portion of the article can be displayed at any given time on the display screen of the mobile device 150. In FIG. 1, the portion of the article that is off screen is outlined by dashed lines and is greyed out. As further shown, the article includes multiple components, which in this example includes three image components 102, 104 and 106, two body text components 108 and 112, one title component 114, and a pull quote component 116.

In some embodiments, the reader application dynamically generates the article layout for display. For instance, in some embodiments, the reader application dynamically defines the layout of the document after receiving the document definition for generating the document display. The document definition includes a definition of each document component, which as mentioned in the above-reference patent application, is in a Javascript Object Notation (JSON) format in some embodiments.

After defining the layout of the document, the reader application of some embodiments inserts stoppage markers within the defined document layout. In some embodiments, each stoppage marker is defined as a line to which an end location of a gesture-based scrolling operation can be snapped. These lines are referred to as snaplines as the end location of a scroll operation should snap to these lines. Also, in some of these embodiments, the reader inserts the snaplines within the layout at locations of some or all of the components. FIG. 1 illustrates several snaplines 155 defined at the boundaries of the body text components 108 and 112, image components, the title component 114, and the pull quote component 116. Also, in some embodiments, the reader inserts snaplines after each paragraph in a body text component.

The first stage 105 further shows a user's finger performing a swipe gesture on the touch-sensitive screen of the mobile device 150. As shown, the swipe gesture has an associated velocity. This velocity is computed by input/ output (I/O) framework of the mobile device, and is passed to the reader by this framework. For this gesture and its associated velocity, the reader application identifies a first document location 160 at which the scroll operation should end. In some embodiments, the application identifies the first location by (1) using a scrolling function that modifies scrolling speed from the initial velocity to zero, and (2) using the scrolling function to identify the first location as a document location at the boundary of the display screen when the scrolling velocity is zero.

The second stage 110 shows that the reader application identifies a neighbor region R about the identified first document location 160. In some embodiments, the size for the neighbor region R depends on the swipe gesture velocity, as further described below by reference to FIGS. 2 and 3. After identifying the neighboring region, the reader application identifies the snapline 155c within the neighbor region, as shown in the second stage 110. The third stage 115 shows the reader terminating the document's scrolling at the location of the identified snapline 155c. Stopping at this location is better than stopping at the first location 160 identified in the first stage 105, because stopping at the first location would cause only a portion of the image 104 to appear on the mobile device's screen. Stopping at an initially identified location could also cut off lines of text, advertisements, or other types of content.

In some embodiments, the reader application terminates the scrolling at the location of the snapline 155c by modifying the scrolling function to identify this location as the document location at the boundary of the display area when the scrolling velocity is zero. In some embodiments, the scroll function treats the location of the snapline 155c as the final stopping location of the scroll and gradually varies the scrolling velocity from an initial velocity to zero as the article scrolls from an initial screen presentation with the title 114 at the top of the screen (as shown in the first stage 105) to a presentation with the snapline 155c's location at the top of the screen (as shown in the third stage 110).

Different embodiments use different techniques to stop a scroll operation at a snapline. U.S. Published Patent Application 2011/0074699 describes several manners for adjusting the scrolling velocity and scrolling function to stop a scroll operation at a logical structure (such as a snapline) instead of at a location that the scroll operation would otherwise terminate. This U.S. Published Patent Application is incorporated herein by reference.

Figure 3:
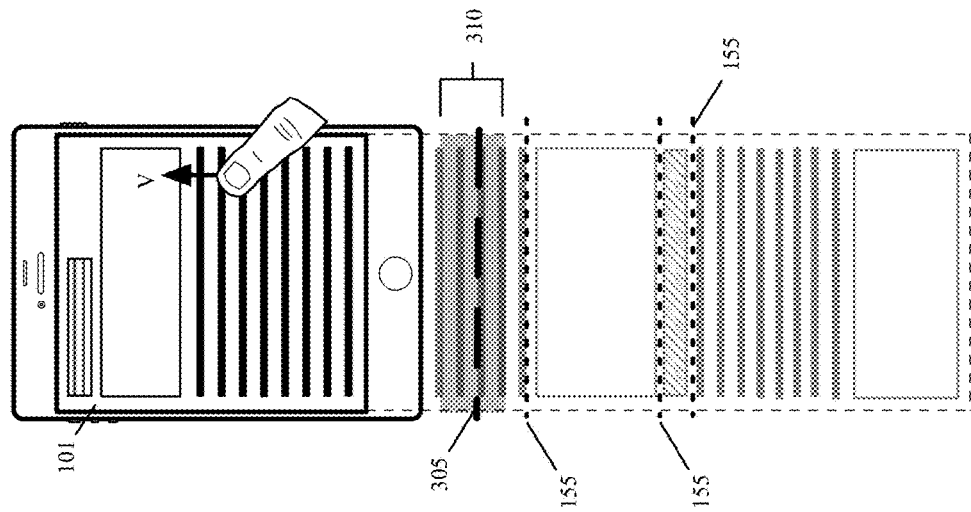
FIGS. 2 and 3 present two examples that illustrate the size of the identified neighbor region R depends on the swipe-gesture velocity in some embodiments.
Figure 2:
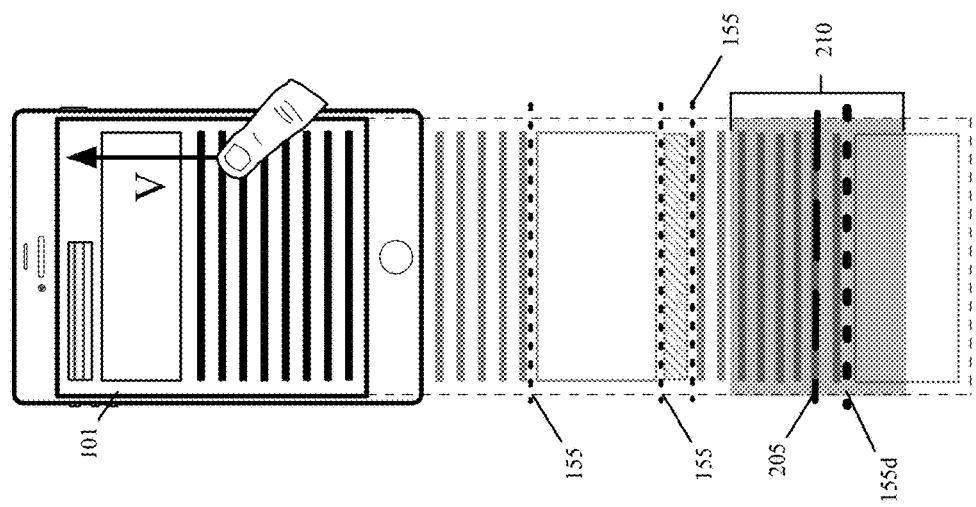

FIGS. 2 and 3 present two examples that illustrate the size of the identified neighbor region R depends on the swipe-gesture velocity in some embodiments. As mentioned above, some embodiments identify larger neighbor region sizes for larger gesture velocities, and smaller neighbor region sizes for smaller gesture velocities. The examples in FIGS. 2 and 3 show two different swipe gestures at the same location of the same article 101 that is presented on the display screen of the device at two different times.

In these examples, the swipe velocity in FIG. 2 is larger than the swipe velocity in FIG. 3. Because of this larger velocity, the reader application identifies an initial stoppage location 205 in FIG. 2 that is farther down than the initial stoppage location 305 that the reader application identifies in FIG. 3. Also, the larger velocity in FIG. 2 causes the reader to identify a larger snapline candidate region 210 about the location 205 than the smaller snapline candidate region 310 that the reader identifies about location 305 based on the smaller gesture velocity speed of FIG. 3. As shown, the smaller snapline candidate region 310 is too small to capture any snaplines 155 that are near the initial stoppage location 305, while the larger snapline candidate region 210 is large enough to capture neighboring snapline 155d. Hence, in the example illustrated in FIG. 2, the scrolling will end at the snapline 155, while in the example illustrated in FIG. 3, the scrolling will end at the identified initial stoppage location 305, which cuts off a line of text.

In some embodiments, the reader does not identify a snapline candidate region about an identified initial scroll stoppage location on the electronic document when the scrolling velocity is less than a threshold value. In this situation, the reader in some embodiments just terminates the scrolling at the identified initial scroll stoppage location. The reader in these embodiments is designed based on an assumption that when the swipe gesture velocity is smaller than a particular value, the user is probably trying to finely modify the display of the document on the screen. Also, snapping the scrolling to a snapline when the swipe gesture speed is low might be too distracting and obtrusive to the user.

Figure 4:
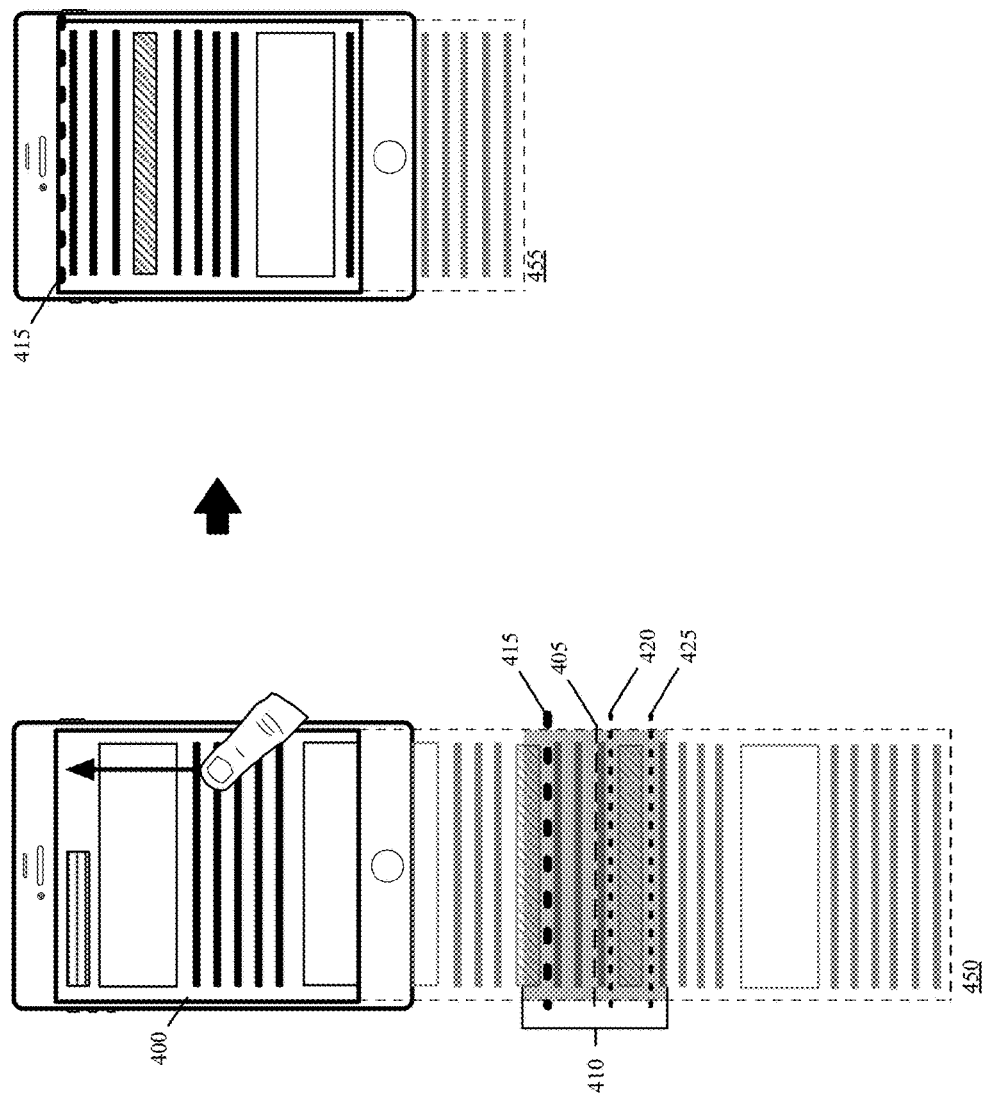
FIGS. 4-6 present three examples that illustrate three different ways that are used in different embodiments to select one of several snaplines in a snapline candidate region.
Figure 5:
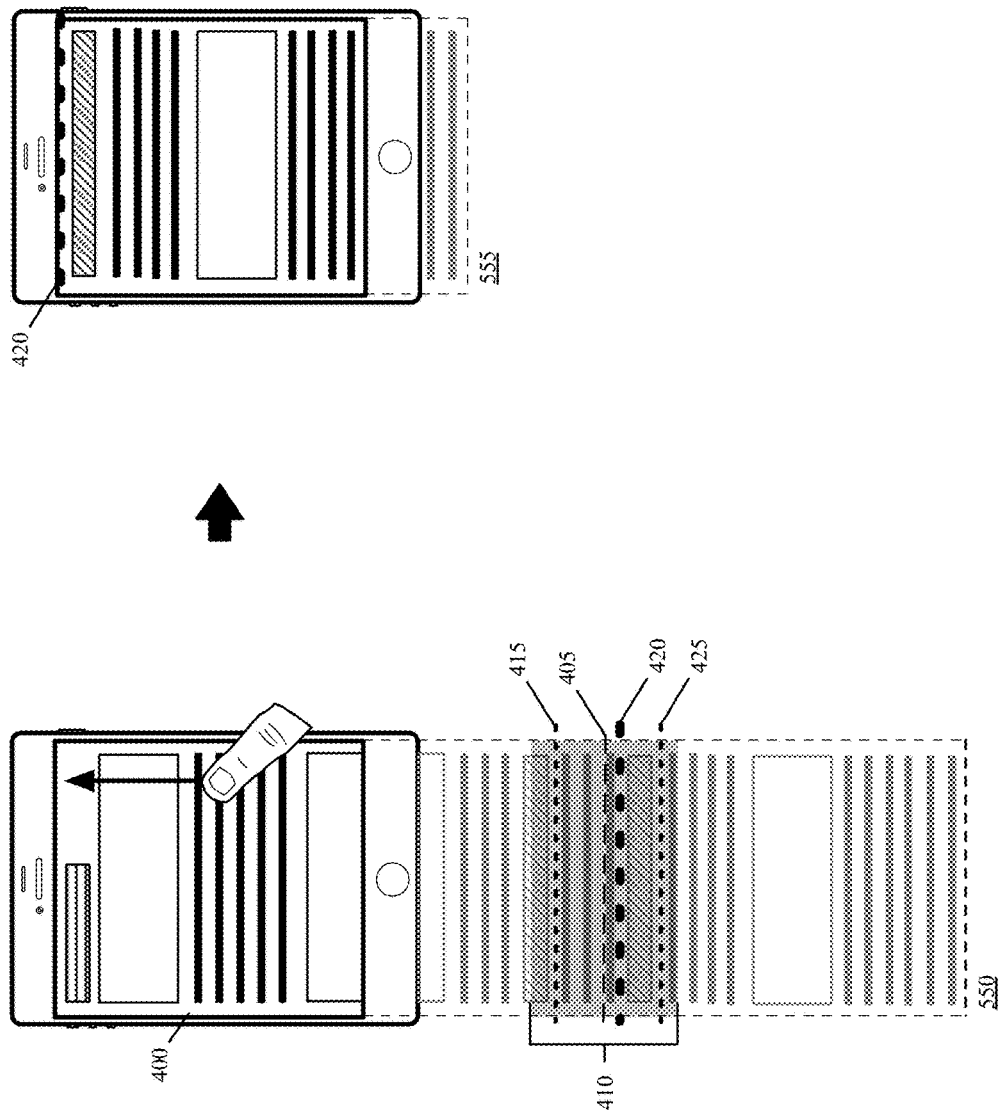
Figure 6:
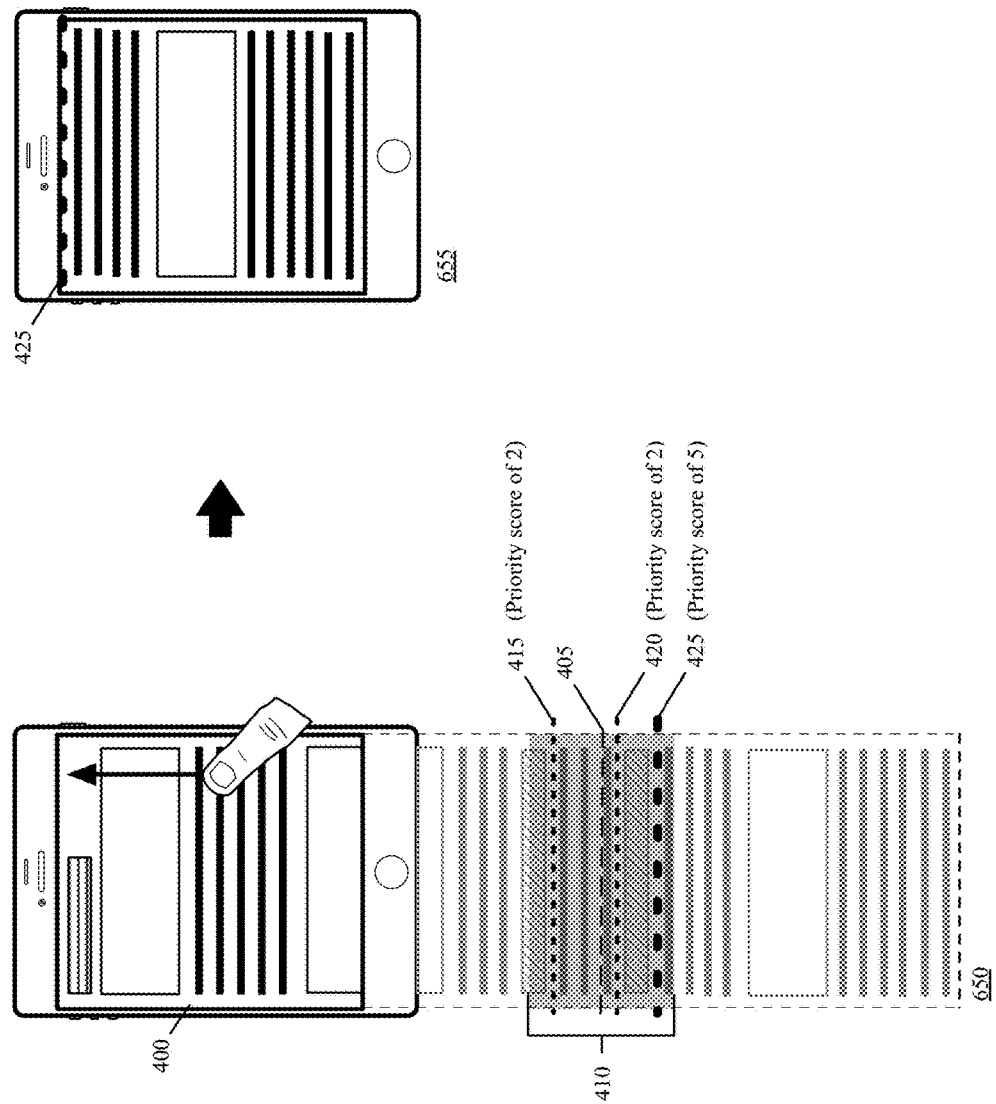

In some cases, the reader application might identify a snapline candidate region with multiple snaplines. In these embodiments, the reader needs to select one of the snaplines as the snapline that defines the location where the scrolling should stop. The reader selects this snapline differently in different embodiments. FIGS. 4-6 present three examples that illustrate three different ways that are used in different embodiments to select one of several snaplines in a snapline candidate region. All of these examples show the same swipe gesture at the same location of the same article 400 that is presented on the display screen of the device.

In these examples, three different embodiments of the reader application identify the same initial scroll stoppage location 405 and the same snapline candidate region 410 about this location. Also, in all of these examples, the snapline candidate region 410 includes three snaplines 415, 420, and 425. Each of these examples is illustrated in two stages, a first stage that shows the identified initial scroll stoppage location 405, the snapline candidate region 410 and the selected snapline, and a second stage that shows the scroll stopped at the selected snapline.

In the example illustrated in FIG. 4, the reader application selects the snapline 415 as the one that specifies the scroll stoppage location, because this snapline is the first snapline in the direction of the scroll, as shown in the first stage 450. The second stage 455 in this example shows the scroll terminated at the location of the snapline 415.

The first stage 550 of FIG. 5 shows the reader application selecting the snapline 420 as the one that specifies the scroll stoppage location. In this example, the reader selects the snapline 420 because it is the snapline closest to the identified initial stoppage location 405. The second stage 555 in this example shows the scroll terminated at the location of the snapline 420. In some embodiments, the reader application does not just pick the snapline closest to the identified initial scroll stoppage location, but picks the snapline that is closest to the identified initial scroll stoppage location in the direction of the scroll. If this is the criteria for the swipe gesture that is illustrated in FIGS. 4-5, the reader application would identify snapline 415 because this snapline is the closest snapline to the initial location 405 in the direction of the scroll.

In some embodiments, the reader application assigns different snaplines with different priorities. In some of the embodiments, when a snapline candidate region has multiple snaplines, the reader application picks the snapline in that region that has the highest priority. When multiple snaplines in the region have the same highest priority, the reader application selects one of the snaplines based on other heuristics (e.g., the first in the direction of scroll, the closest, the closest in the direction of scroll, etc.).

FIG. 6 illustrates an example where the reader application selects a candidate snapline based on priority designation. The first stage 650 of this figure shows the reader application selecting the snapline 425 as the one that specifies the scroll stoppage location. In this example, the reader picks the snapline 425 because this snapline has the highest priority. The second stage 655 in this example shows the scroll terminated at the location of the snapline 425.

In this example, the snapline 425 has a priority score of 5, while the other two snaplines have a priority score of 2. In other examples, a lower priority score specifies a higher priority value, e.g., with a priority score of 1 designating the highest priority. In some embodiments, different types of priorities are designated for different types of content of the document. For instance, in some embodiments, the reader application designates different priority values for different types of document components, and the snaplines associated with different components derive their priority values from their associated document components. Examples of document components include title, pull quote, image, body text, and advertisement. In some embodiments, each of these components has as associated priority value (e.g., pull quotes have higher priority values than images, which have higher priority values than body texts and advertisements), and the snapline associated with a component derives its priority value from its components priority value.

One of ordinary skill will realize that other embodiments use other heuristics for selecting one snapline when multiple snaplines are in a snapline candidate region. For instance, in some embodiments, some embodiments select the snapline based on priorities if snaplines of certain priority values are in the region (e.g., priorities 5-7). If no such snaplines are in a region, these embodiments select the snapline based on another heuristic criteria (e.g., closest snapline, first snapline, etc.).

Figure 7:
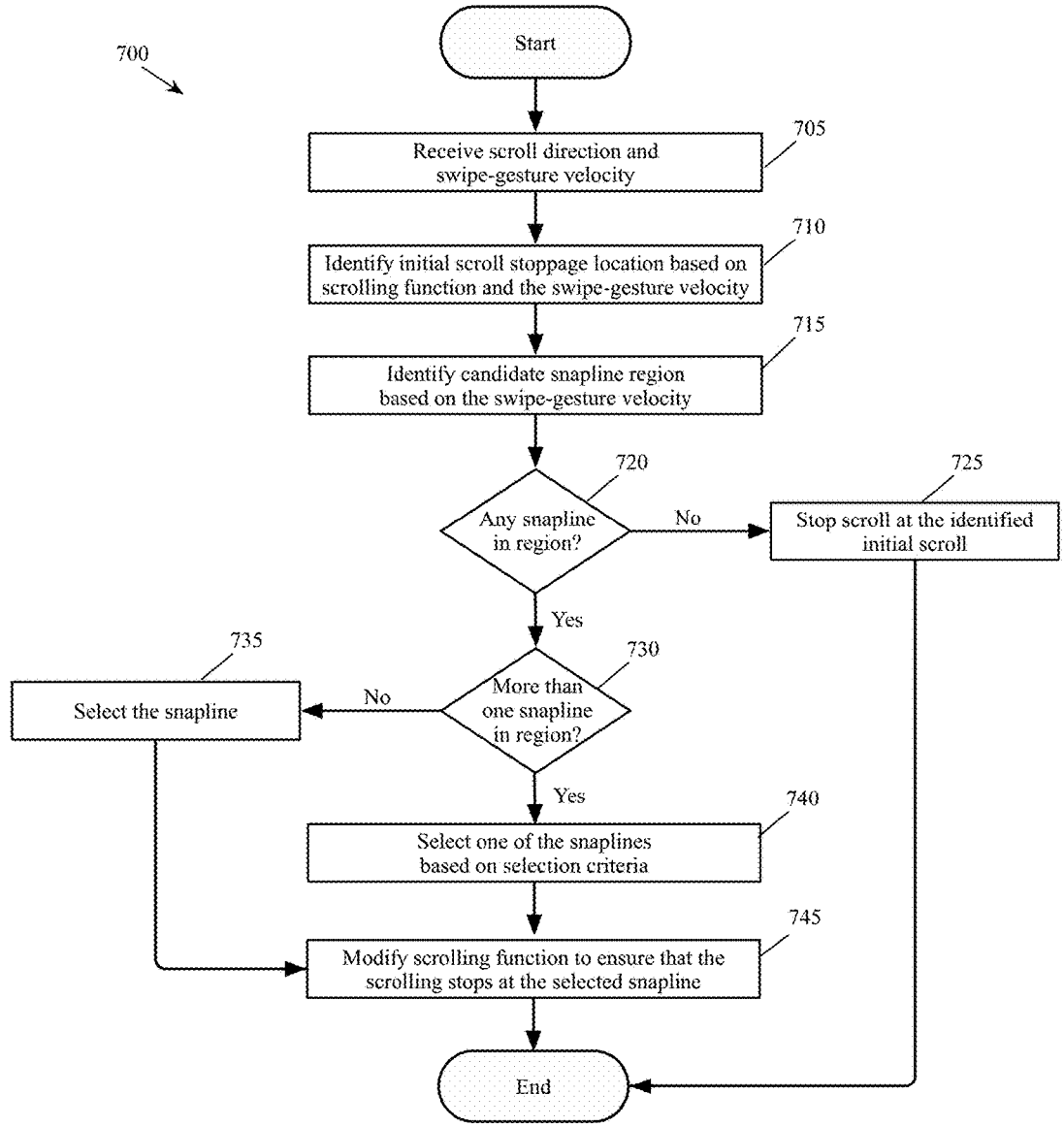
FIG. 7 conceptually illustrates a process that the reader application of some embodiments performs to scroll a document in response to a swipe gesture.

FIG. 7 conceptually illustrates a process 700 that the reader application of some embodiments performs to scroll a document in response to a swipe gesture. As shown, the process starts (at 705) when the reader application receives a swipe gesture as it is displaying a document. The document can be an article, a webpage, an article feed page (that contains summaries of several articles), a document prepared by a word processing application, or any other type of document.

The received swipe gesture has a velocity. Based on this velocity and scrolling function that accounts for this velocity, the process identifies (at 710) an initial scroll stoppage location. Identification of initial scroll stoppage locations is described above by reference to FIGS. 1-6. Next, at 715, the process identifies a neighboring region about the identified initial scroll stoppage location. As described above by reference to FIGS. 2 and 3, this neighboring region depends on the velocity of the swipe gesture.

At 720, the process then determines whether any snaplines are defined for the neighboring region. If not, the process allows (at 725) the document to stop scrolling at the scroll stoppage location identified at 710. As mentioned above, this scroll stoppage location is positioned at a boundary (e.g., at the top or at the bottom) of the area for displaying the document. After 725, the process ends.

On the other hand, when the process determines (at 720) that there are snaplines defined for the identified neighboring region, the process 700 determines (at 730) whether this region contains more than one snapline. If not, the process selects (at 735) the one snapline in this region as the snapline that defines the scroll stoppage location, and then transitions to 745, which will be described below.

When the identified neighboring region has more than one snapline, the process then selects (at 740) one of the snaplines in this region based on a set of heuristics. As described above by reference to FIGS. 4-6, examples of these heuristics include selecting the first snapline, the snapline with the highest priority, the snapline closest to the initially identified scroll stoppage location, or the snapline closest to the initially identified scroll stoppage location in the direction of the scroll. After 740, the process transitions to 745.

At 745, the process modifies the scrolling function to define the location of the selected snapline (i.e., the snapline selected at 735 or 740) as the location at which the scroll has to end. As mentioned above, this scroll stoppage location is positioned at a boundary (e.g., at the top or at the bottom) of the area for displaying the document. After 745, the process 700 ends.

Figure 8:
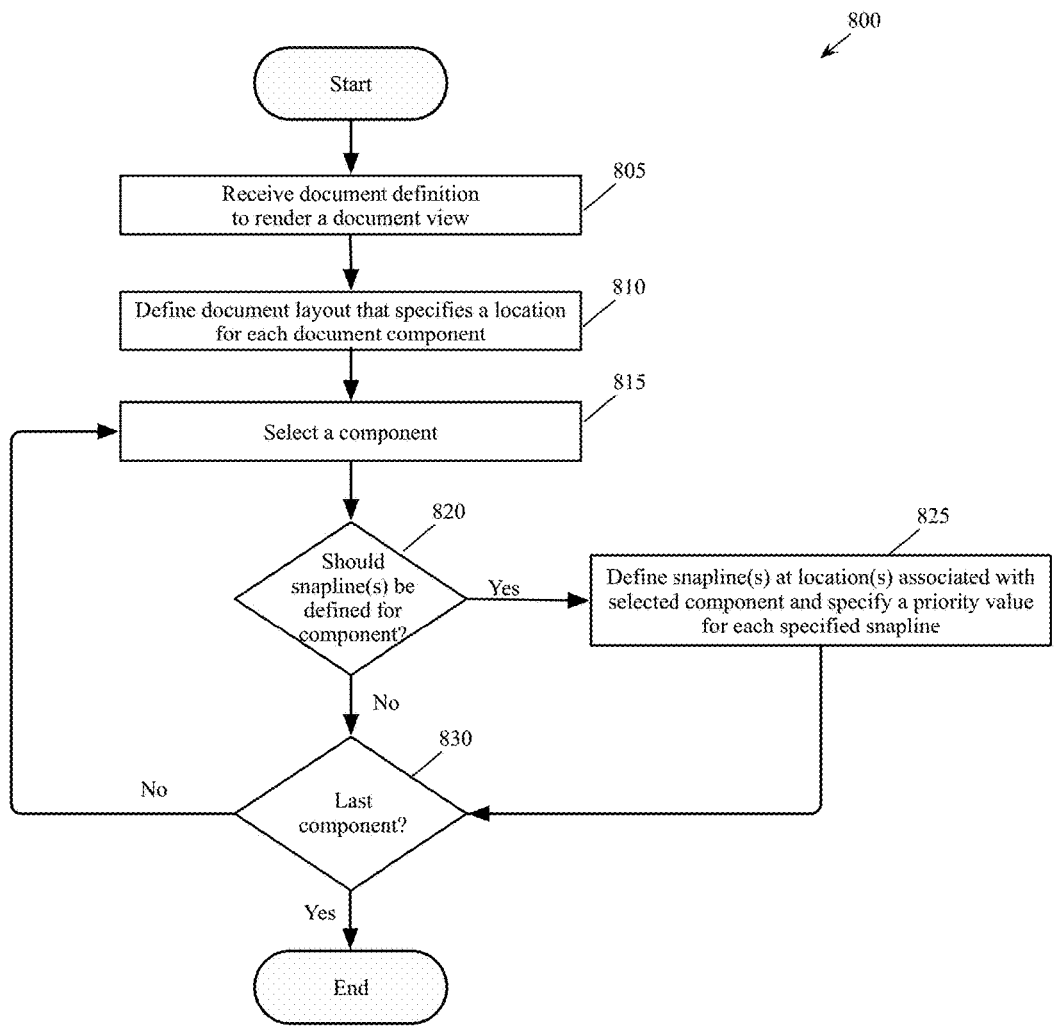
FIG. 8 illustrates a process the reader application performs to define snaplines for a document.

In some embodiments, the snaplines are inserted into the document after the layout of the document is defined. For instance, the reader application in some embodiment first dynamically defines the layout of the document after receiving the document definition for generating the document display, and then inserts the stoppage markers within the defined layout. FIG. 8 illustrates a process 800 the reader application performs to define snaplines for a document. This process will be explained by reference to FIG. 9, which shows an example of a document and the snaplines that are defined for it.

Figure 9:
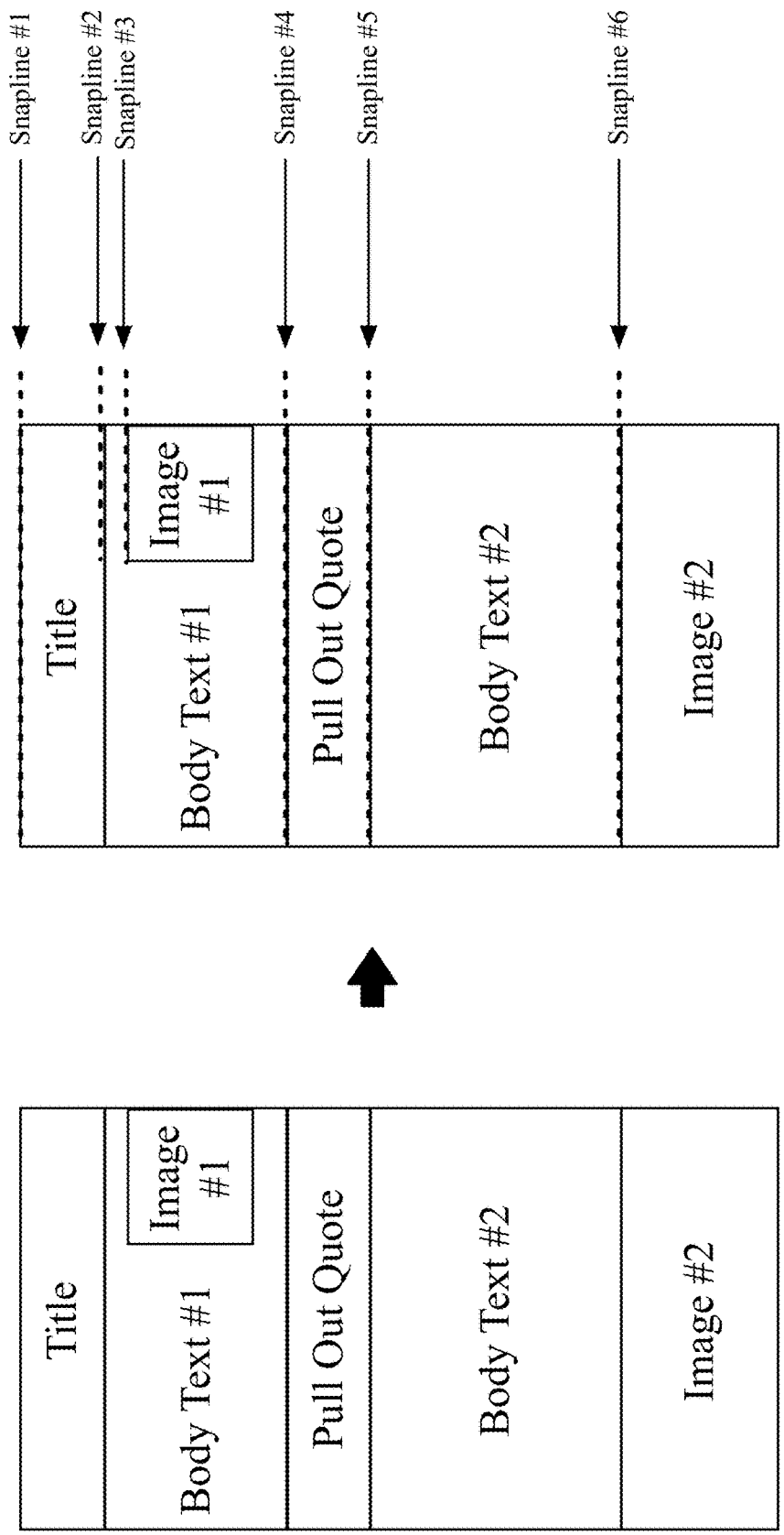
FIG. 9 shows an example of a document and the snaplines that are defined for it.

As shown, the process 800 initially receives (at 805) a definition of a document for which the reader application has to define a layout and then has to render based on the defined layout. The document definition includes a definition of several document components. As mentioned above, the document definition uses JSON format to define each document component in some embodiments. FIG. 9 illustrates that the document components in some embodiments includes body text components 905, image components 910, a title component 915, and pull quote components 920.

After receiving the document definition, the process 800 dynamically defines (at 810) the document layout by specifying a location and an area for each document component. In some embodiments, the document definition specifies the role, the association (with other components), the width, and the horizontal position of each document component. These specifications of the components are initial layout specifications for indicating the publisher/author's intent. In some embodiments, these initial layout specifications are specified coarsely by referring to columns. Based on these initial layout specifications, the process determines the actual layout of each component (i.e., its actual shape, size, and position) using a set of device-specific design rules as well as the layouts of other components in the document. The finalized/actual layouts of the components are specified in terms of display points or pixels in some embodiments.

In some embodiments, the document definition is in a form of a content presentation structure (CPS). CPS is an inventive structure that is described in concurrently filed U.S. patent application Ser. No. 14/870,791, filed Sep. 30, 2015, titled "Generating Layout for Content Presentation Structures". In some embodiments, an authored content delivery system delivers an internal CPS of an authored content to the client device to be presented by its reader application. An internal CPS contains the authored content in presentation structures that are enriched with styling/formatting/layout information and elaborated with necessary presentation resources. The client device in turn performs layout operations in order to determine the actual position and size/shape of each component in the presentation of the authored document according to the received internal CPS and the client device's own design rules.

From an internal CPS, the process 800 performs (at 810) layout operations to determine the area and the position of the various components. For each component, the internal CPS specifies its role, its association, its width, and its horizontal position. These specifications of the components are initial layout specifications for indicating the publisher/author's intent. In some embodiments, these initial layout specifications are specified coarsely by referring to columns. Based on these initial layout specifications, the process determines the actual layout of each component (i.e., its actual shape, size, and position) using a set of device-specific design rules as well as the layouts of other components in the article. The finalized/actual layouts of the components are specified in terms of display points or pixels in some embodiments.

In some embodiments, the layout of the CPS components for a client device is constrained by the design rules of that client device. In some embodiments, the design rule of a client device is specified in accordance with the display dimensions and capabilities of the device. These design rules are enforced to ensure that the resulting blueprint would result in good looking presentations for the specific display dimensions of the client device. These rules are also dependent on the roles of the component.

In some embodiments, the size and the position of components as specified by the internal CPS are only preliminary. It is coarsely specified in terms of columns rather actual display points or pixels, and it does not specify the height of the components. The layout generator therefore has to determine the true position, width/height/shape of the component in terms of display points or pixels. However, since the size and position of a component often depend on the size and/or position of other components, the laying out of a component (i.e., the determination of true position/width/height/shape of the component) cannot take place until the sizes and/or positions of those components that it depend on have been determined. In other words, the layout of components needs to occur in an order that is sorted according to the dependencies between the components. To determine such a sorted order, some embodiments create a dependency graph and use the dependency graph to solve for the order by which the layout of components is to follow.

In some embodiments, the dependency graph is a list of items, where each item corresponds to either to the size of a component or the position of a component. In some embodiments, the items of the dependency graph are solved by using a stack. The items of the dependency graph are placed in an original, unsorted list. The items in the unsorted list would enter the stack in order. Each item at top of the stack would move on to the sorted/solved list if it has no dependency or if all of its dependencies are already in the sorted/solved list. Conversely, an item having dependencies to items in the unsorted original list would stay in the stack (and have other items pushed on top of it) until all of its dependencies have moved onto the sorted/solved list and it is on top of the stack. Concurrently filed U.S. patent application Ser. No. 14/870,971, filed Sep. 30, 2015, titled "Generating Layout for Content Presentation Structures", further describes the dynamic document layout generation operation that the process 800 performs at 810. This concurrently filed application is incorporated herein by reference.

After dynamically defining (at 810) the document layout, the process 800 iterates through the document components and inserts one or more snaplines in the document for some or all document components. Specifically, at 815, the process selects a component. Next, at 820, the process determines whether it should define one or more snaplines for the components. If not, the process transitions to 830, which will be described below.

Otherwise, at 825, the process defines one or more snaplines for the selected component. In some embodiments, the process defines snaplines at the top boundaries, bottom boundaries, or both top and bottom boundaries of the document components. In the example illustrated in FIG. 9, the reader application inserts snaplines at the top of each document component because in this example the reader positions the snaplines at the top boundary of the display area that shows the document. Positioning the snaplines at the top boundary facilitates with the scroll operations placing document components at the top of the display area.

In addition to defining snaplines at the top and/or bottom boundary of a document component, the process 800 in some embodiments defines snaplines within a document component. For instance, in some embodiments, the process defines snaplines before each paragraph in a body text component. Also, some embodiments use composite image components, and define multiple snaplines for some such components. A composite image component is an image component that has multiple images. When one image is positioned on top of one another image in a composite image component, the process 800 in some embodiments defines a snapline at the top boundaries, the bottom boundaries or at the top and bottom boundaries of the two stacked image components in the composite image component.

The reader application in some embodiments defines a snapline in the document like it defines any other component in the document. Specifically, in these embodiments, a snapline is an object instance of a snapline class, and the document is defined to include this snapline object and other objects that define other document components. Unlike many other document objects, a snapline object is not intended for display, but rather is used to control the scrolling of the document. The snapline object in some embodiments has a position in the document that is dynamically determined like the position of many other objects in the document. In some embodiments, the snapline object's position is defined on its own (e.g., by reference to positional attributes that define the snapline's position in the document), while in other embodiments the snapline's position is defined by reference to the position of its associated component.

In other embodiments, a snapline that is associated with a document component is an attribute of the document component. For instance, in some embodiments, each document component that is for display, includes one or more snapline attributes that can be enabled or disabled. In these embodiments, a snapline is defined by enabling the snapline attribute of the document component. In some embodiments, each snapline attribute has a fixed position with respect to its component, while in other embodiments each snapline attribute has a position value that can be dynamically defined (e.g., with respect to the position of its associated component).

In addition to defining a location for the selected snapline by reference to the selected document components, the process 800 specifies (at 825) a priority value for the selected snaplines based on the selected document component. As mentioned above, different priority values are assigned to snaplines that are associated with different (types of) document components in some embodiments. Hence, at 825, the process 800 has snaplines that it defines inherit their priority value from the priority values that are associated with the document components for which the snaplines are defined. After 825, the process transitions to 830.

At 830, the process determines whether it has examined all the components of the document. If so, the process 800 ends. Otherwise, the process transitions back to 815 to select another component.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
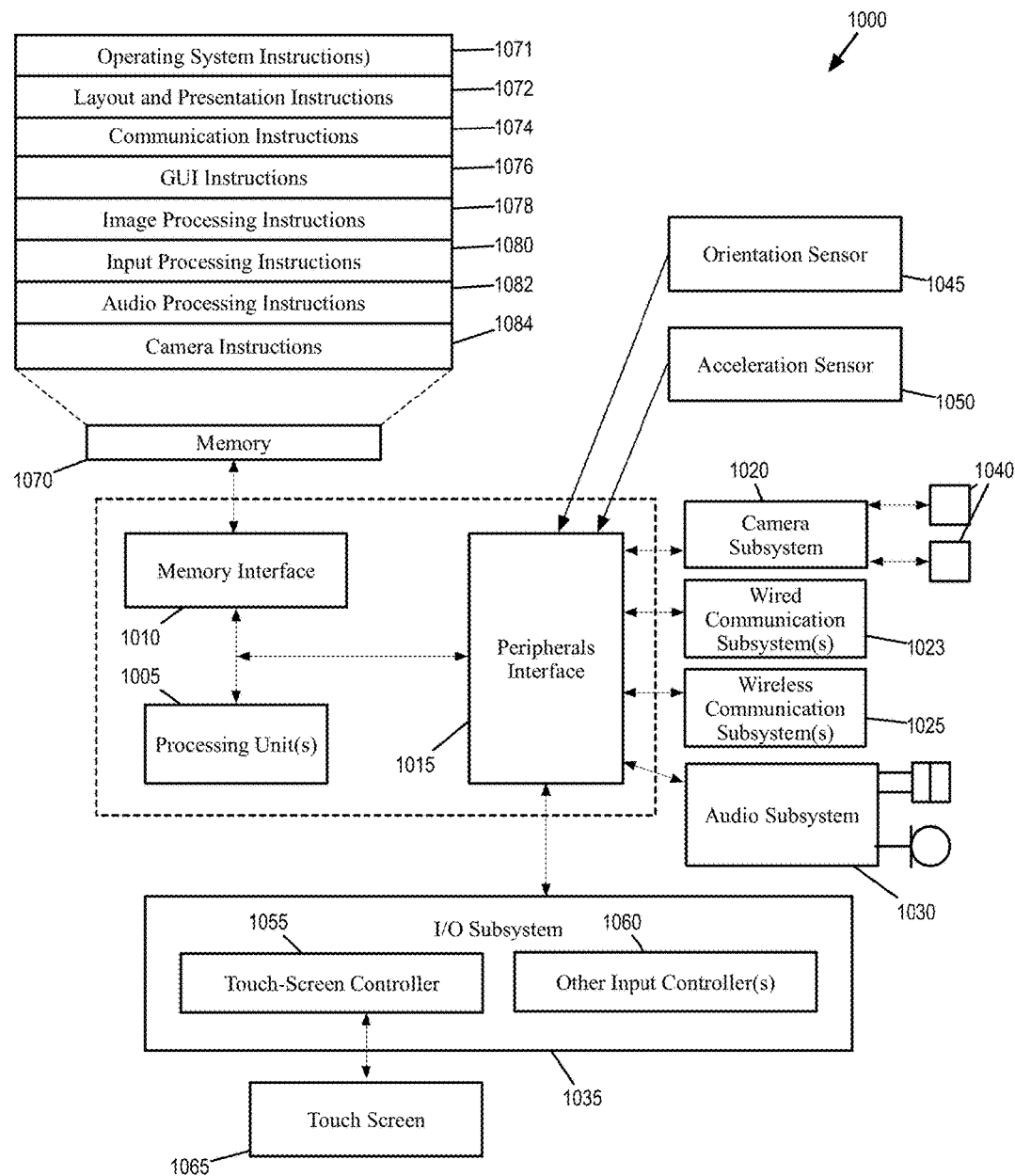
FIG. 10 is an example of an architecture of a mobile computing device.

The user data sharing of some embodiments occurs on mobile devices, such as smart phones (e.g., iPhones®) and tablets (e.g., iPads®). FIG. 10 is an example of an architecture 1000 of such a mobile computing device. As shown, the mobile computing device 1000 includes one or more processing units 1005, a memory interface 1010 and a peripherals interface 1015.

The peripherals interface 1015 is coupled to various sensors and subsystems, including a camera subsystem 1020, a wired communication subsystem(s) 1023, a wireless communication subsystem(s) 1025, an audio subsystem 1030, an I/O subsystem 1035, etc. The peripherals interface 1015 enables communication between the processing units 1005 and various peripherals. For example, an orientation sensor 1045 (e.g., a gyroscope) and an acceleration sensor 1050 (e.g., an accelerometer) is coupled to the peripherals interface 1015 to facilitate orientation and acceleration functions.

The camera subsystem 1020 is coupled to one or more optical sensors 1040 (e.g., a charged coupled device (CCD) optical sensor, a complementary metal-oxide-semiconductor (CMOS) optical sensor, etc.). The camera subsystem 1020 coupled with the optical sensors 1040 facilitates camera functions, such as image and/or video data capturing. The wired communication subsystem 1023 and wireless communication subsystem 1025 serve to facilitate communication functions.

In some embodiments, the wireless communication subsystem 1025 includes radio frequency receivers and transmitters, and optical receivers and transmitters (not shown in FIG. 10). These receivers and transmitters of some embodiments are implemented to operate over one or more communication networks such as a GSM network, a Wi-Fi network, a Bluetooth network, etc. The audio subsystem 1030 is coupled to a speaker to output audio (e.g., to output voice navigation instructions). Additionally, the audio subsystem 1030 is coupled to a microphone to facilitate voice-enabled functions in some embodiments.

The I/O subsystem 1035 involves the transfer between input/output peripheral devices, such as a display, a touch screen, etc., and the data bus of the processing units 1005 through the peripherals interface 1015. The I/O subsystem 1035 includes a touch-screen controller 1055 and other input controllers 1060 to facilitate the transfer between input/output peripheral devices and the data bus of the processing units 1005. As shown, the touch-screen controller 1055 is coupled to a touch screen 1065. The touch-screen controller 1055 detects contact and movement on the touch screen 1065 using any of multiple touch sensitivity technologies. The other input controllers 1060 are coupled to other input/control devices, such as one or more buttons. Some embodiments include a near-touch sensitive screen and a corresponding controller that can detect near-touch interactions instead of or in addition to touch interactions.

The memory interface 1010 is coupled to memory 1070. In some embodiments, the memory 1070 includes volatile memory (e.g., high-speed random access memory), non-volatile memory (e.g., flash memory), a combination of volatile and non-volatile memory, and/or any other type of memory. As illustrated in FIG. 10, the memory 1070 stores an operating system (OS) 1071. The OS 1071 includes instructions for handling basic system services and for performing hardware dependent tasks. The memory 1070 additionally includes layout and presentation instructions 1072 in order for the device 1000 to perform the layout generation and the presentation management operations of some embodiments. In some embodiments, these instructions 1072 may be a subset of the operating system instructions 1071, or may be part of the instructions for an application such as the reader application.

The memory 1070 also includes communication instructions 1074 to facilitate communicating with one or more additional devices (e.g., for peer-to-peer data sharing, or to connect to a server through the Internet for cloud-based data sharing); graphical user interface instructions 1076 to facilitate graphic user interface processing; image processing instructions 1078 to facilitate image-related processing and functions; input processing instructions 1080 to facilitate input-related (e.g., touch input) processes and functions; audio processing instructions 1082 to facilitate audio-related processes and functions; and camera instructions 1084 to facilitate camera-related processes and functions. The instructions described above are merely exemplary and the memory 1070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 10 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 10 may be split into two or more integrated circuits.

Figure 11:
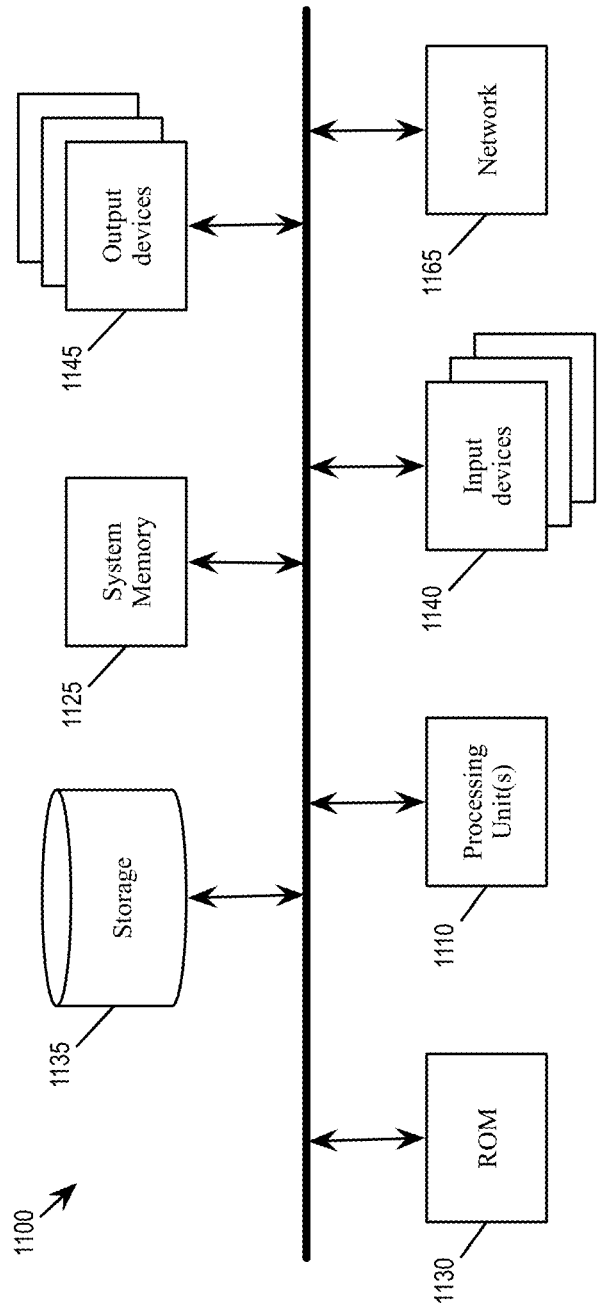
FIG. 11 conceptually illustrates another example of an electronic system with which some embodiments of the invention are implemented.

FIG. 11 conceptually illustrates another example of an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110. In some embodiments, such functionality can be provided using CoreImage's kernel shading language.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive, integrated flash memory) as the permanent storage device 1135.

Other embodiments use a removable storage device (such as a floppy disk, flash memory device, etc., and its corresponding drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet), or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program for scrolling an electronic document that is displayed in a display area on a display screen, the program comprising sets of instructions for:
    defining a plurality of snaplines within the electronic document based on a set of locations associated with a plurality of components of the electronic document;
    receiving a swipe gesture on a touch-sensitive input surface displaying the electronic document;
    scrolling the electronic document based upon the swipe gesture;
    identifying:
        (i) a first scroll stoppage location on the electronic document for terminating the scrolling, wherein the first scroll stoppage location is based upon the swipe gesture;
        (ii) a region around the identified first scroll stoppage location, wherein the region is identified based upon the first scroll stoppage location, and the region is identified prior to identifying any defined snaplines within the region; and
        (iii) a plurality of snaplines within the region, wherein each snapline of the plurality of snaplines comprises an assigned priority value and an assigned location within the electronic document;
    selecting, from the plurality of identified snaplines within the region, a snapline within the region that has a highest priority value; and
    terminating the scrolling at the selected snapline so that, instead of the first scroll stoppage location, the respective assigned location of the selected snapline is at a boundary of the display area.

2. The non-transitory machine readable medium of claim 1, wherein the program further comprises sets of instructions for:
    determining that no snapline is defined within the region; and
    terminating the scrolling with the first scroll stoppage location at the boundary of the display area when no snapline is defined within the region.

3. The non-transitory machine readable medium of claim 1, wherein
    the electronic document comprises a plurality of document components,
    each snapline of the plurality of snaplines is associated with a document component of the plurality of document components, and
    the priority value of each snapline is obtained from the priority value of the snapline's associated document component.

4. The non-transitory machine readable medium of claim 3, wherein the plurality of document components include at least two of a body text component, an image component, a pull quote component, and an advertisement component.

5. The non-transitory machine readable medium of claim 3, wherein the program further comprises sets of instructions for:
    defining a layout that specifies an arrangement of the document components on a displayed presentation of the electronic document; and
    defining snaplines of the plurality of snaplines for the layout based on locations associated with a set of document components in the layout.

6. The non-transitory machine readable medium of claim 5, wherein the program further comprises sets of instructions for receiving a definition of the electronic document from another device through a network, the definition specifying the document components.

7. The non-transitory machine readable medium of claim 5, wherein the set of instructions for defining the layout is based on at least one attribute of the display screen on which the presentation is to be displayed.

8. A device comprising:
    a display screen;
    a non-transitory machine readable medium storing a program for scrolling an electronic document that is displayed in a display area on the display screen, the program comprising sets of instructions for:
        receiving a definition of the electronic document comprising a plurality of different components;
        defining a set of snaplines within the electronic document based on a set of locations associated with a set of components of the electronic document;
        receiving a scroll input;
        identifying a first scroll stoppage location based on the received scroll input for terminating the scrolling;
        identifying a candidate region around the identified first scroll stoppage location, wherein the candidate region is identified based upon the identified first scroll stoppage location independent of whether any defined snaplines are identified within the candidate region, wherein each snapline defines a location for terminating scrolling of the electronic document across the display area instead of the identified first scroll stoppage location that is identified based on the received scroll input;
    wherein at least two different snaplines have different priorities for allowing selection of one of the two snaplines when both the snaplines are within the candidate region around the identified first scroll stoppage location based on received scroll input;
    selecting, from the two snaplines, a snapline within the region that has a highest priority value; and
    terminating the scrolling at the selected snapline so that, instead of the first scroll stoppage location, the respective location of the selected snapline is at a boundary of the display area.

9. The device of claim 8,
    wherein the program further comprises sets of instructions for defining a layout that specifies an arrangement of the document components on a displayed presentation of the electronic document; and wherein the set of instructions for defining the set of snaplines is based on locations associated with the set of document components in the layout.

10. The device of claim 9, wherein the set of instructions for defining the layout is based on at least one attribute of a display screen on which the presentation is to be displayed.

11. A non-transitory machine readable medium storing a program for scrolling an electronic document that is displayed in a display area on a display screen, the program comprising sets of instructions for:
defining a plurality of snaplines within the electronic document based on a set of locations associated with a plurality of corn orients of the eletronic document;
receiving a swipe gesture on a touch-sensitive input surface, the swipe gesture having a velocity;
scrolling the electronic document on the display screen based on the swipe gesture;
identifying a first scroll stoppage location on the electronic document for terminating the scrolling based on the swipe gesture;
identifying a region around the identified first scroll stoppage location based upon the swipe gesture and prior to identifying any defined snapilnes within the region, wherein a size of the region is based on the velocity of the swipe gesture;
within the region, selecting a snapline that is defined at a second location of the electronic document, the snapline being a first snapline in the region in a direction of the scrolling; and
terminating the scrolling at the second location so that, instead of the first scroll stoppage location, the second location of the identified snapline within the region is at a boundary of the display area.

12. The non-transitory machine readable medium of claim 11, wherein the program further comprises sets of instructions for:
determining whether the velocity exceeds a threshold; and
terminating the scrolling with the first scroll stoppage location at the boundary of the display area when the velocity does not exceed the threshold.

13. The non-transitory machine readable medium of claim 11, wherein the instructions for identifying the region comprises a set of instructions for identifying a larger region size for larger swipe gesture velocities than for smaller swipe gesture velocities.

14. The non-transitory machine readable medium of claim 11, wherein identifying the snapline comprises determining whether the snapline is within the region;
wherein the program further comprises sets of instructions for:
determining that no snapline is defined within the region; and
terminating the scrolling with the first scroll stoppage location at the boundary of the display area when no snapline is defined within the region.

15. The non-transitory machine readable medium of claim 11,
wherein the instructions for identifying the first scroll stoppage location comprises sets of instructions for:
defining a scrolling function that modifies scrolling speed from an initial velocity to zero; and
using the scrolling function to identify the first scroll stoppage location as a document location at the boundary of the display area when the scrolling speed is zero;
wherein the instructions for terminating the scrolling at the second location of the identified snapline comprises a set of instructions for modifying the scrolling function to identify the second location as the document location at the boundary of the display area when the scrolling velocity is zero.

16. The non-transitory machine readable medium of claim 11, wherein the snapline is a first snapline, wherein the set of instructions for identifying the first snapline comprises sets of instructions for:
within the region, identifying a plurality of snaplines including the first snapline; and
selecting the first snapline as the snapline of the plurality of snaplines to define the second location to terminate the scrolling because the second location defined by the first snapline is nearer to the first scroll stoppage location than a respective location corresponding to any other snapline of the plurality of snaplines.

17. The non-transitory machine readable medium of claim 11, wherein the snapline is a first snapline, wherein the set of instructions for identifying the first snapline comprises sets of instructions for:
within the region, identifying a plurality of snaplines including the first snapline, wherein at least two identified snaplines have two different levels of priority; and
selecting the first snapline as the snapline of the plurality of snaplines to define the second location to terminate the scrolling because the first snapline is a snapline of the plurality of snaplines with a highest level of priority.

18. A device comprising:
a display screen;
a non-transitory machine readable medium storing a program for scrolling an electronic document that is displayed in a display area on the display screen, the program comprising sets of instructions for:
receiving a definition of the electronic document to display;
dynamically generating a layout of the electronic document based on a set of characteristics of the electronic document;
defining a plurality of snaplines within the dynamically generated layout, the snaplines for defining locations for terminating scrolling of the electronic document across the display area in place of a first scroll stoppage location that is identified based on a received scroll input;
receiving the scroll input; and
identifying:
(i) the first scroll stoppage location on the electronic document for terminating the scrolling based on the received scroll input;
(ii) a region around the identified first scroll stoppage location, wherein the region is identified based upon the first scroll stoppage location, and the region is identified independent of whether any of the plurality of defined snaplines are identified within the region; and
(iii) the plurality of snaplines within the region, wherein each of the plurality of snaplines comprises an assigned priority value and an assigned location within the electronic document;
selecting, from the plurality of identified snaplines within the region, a snapline within the region that has a highest priority value; and
terminating the scrolling at the selected snapline so that, instead of the first scroll stoppage location, the respective assigned location of the selected snapline is at a boundary of the display area.

19. The device of claim 18 further comprising a network interface for receiving the document definition from another device through a network.

20. The device of claim 18 further comprising a touch-sensitive input surface, wherein the program further comprises sets of instructions for:
- receiving a swipe gesture on the touch-sensitive input surface as the scroll input;
- within the region, identifying a snapline of the plurality of snaplines that is defined at a second location of the electronic document; and
- terminating the scrolling so that, instead of the first scroll stoppage location, the second location of the identified snapline is at a boundary of the display area.

21. The device of claim 18,
- wherein the electronic document comprises a plurality of components,
- wherein the set of instructions for dynamically generating the layout comprises a set of instructions for specifying an arrangement of the components on a displayed presentation of the electronic document; and
- wherein the set of instructions for defining the plurality of snaplines comprises a set of instructions for defining the plurality of snaplines within the layout at boundaries of a plurality of components.

22. The device of claim 21, wherein
- at least two different components of the electronic document are two different types of content,
- the snaplines defined for the two different components are assigned two different priority values, and
- when two different snaplines are both viable candidate for terminating the scrolling within the region, the snapline with a higher priority value is selected for terminating the scrolling.

23. The device of claim 22, wherein the components include at least two of a body text component, an image component, a pull quote component, and an advertisement component.

* * * * *